(12) United States Patent
Setzer

(10) Patent No.: US 9,155,252 B2
(45) Date of Patent: Oct. 13, 2015

(54) ABOVE-GROUND PLANTING BED

(71) Applicant: Barry D. Setzer, Blowing Rock, NC (US)

(72) Inventor: Barry D. Setzer, Blowing Rock, NC (US)

(*) Notice: Subject to any disclaimer, the term of this patent is extended or adjusted under 35 U.S.C. 154(b) by 0 days.

(21) Appl. No.: 14/185,738

(22) Filed: Feb. 20, 2014

(65) Prior Publication Data

US 2014/0165464 A1    Jun. 19, 2014

Related U.S. Application Data

(62) Division of application No. 13/437,773, filed on Apr. 2, 2012.

(51) Int. Cl.
| | |
|---|---|
| *A01G 1/08* | (2006.01) |
| *B65D 35/00* | (2006.01) |
| *B65D 33/00* | (2006.01) |
| *B65D 8/14* | (2006.01) |
| *A01G 9/02* | (2006.01) |

(52) U.S. Cl.
CPC . *A01G 9/021* (2013.01); *A01G 1/08* (2013.01)

(58) Field of Classification Search
CPC ............... B65D 85/50; B65D 21/0233; B65D 21/0213; B65D 5/001; B65D 5/0015; B65D 5/0055; B65D 5/48; B65D 5/5021; B65D 81/2084; B65D 85/345; B65D 85/54; B65D 81/3261; B65D 33/00; B65D 75/008; B65D 32/22; B65D 33/008; B65D 25/04; B65D 29/00; B65D 31/10; B65D 75/5877; B65D 81/3272; B65D 81/3461; B65D 33/001; B65D 33/01; B65D 81/2023; B65D 81/2061; B65D 81/208

USPC ............... 47/33, 65.7, 65.8, 66.1, 66.5, 66.6; 220/506, 6, 9.2, 495.06, 495.07; 383/38; 206/423; 119/61.54, 65, 51.5, 119/61.56, 74

See application file for complete search history.

(56) References Cited

U.S. PATENT DOCUMENTS

| | | | | |
|---|---|---|---|---|
| 3,204,678 | A | * | 9/1965 | Worcester ........................ 383/3 |
| 3,775,903 | A | | 12/1973 | Pike |
| 4,888,914 | A | | 12/1989 | Reiger |
| 4,901,885 | A | * | 2/1990 | Boots ............................ 383/119 |
| 5,289,937 | A | * | 3/1994 | Boots ............................ 220/9.1 |
| 5,406,745 | A | | 4/1995 | Lin ............................ 47/1.01 F |

(Continued)

OTHER PUBLICATIONS

Bacsac growbag; published Dec. 7, 2010; www.bacsac.fr/en/ or http://web.archive.org/web/20101207090156/http://www.bacsac.fr/en/; retrieved Feb. 11, 2013; hereinafter "Bacsac").*

(Continued)

*Primary Examiner* — Richard Price, Jr.
*Assistant Examiner* — George Andonyan
(74) *Attorney, Agent, or Firm* — Shefte Law PLLC; Dalbert U. Shefte

(57) ABSTRACT

A non-cylindrical planting bed in rectangular, square or oval configuration for containing plant growth media and plants. The bed has a bottom wall, an exterior side wall, and either one or two semi-cylindrical walls inside and secured to the outer wall, or two cylindrical walls either wholly inside or having a portion forming a portion of the exterior side wall for strengthening of the bed. In forms having two cylindrical or two semi-cylindrical inner walls, cross walls may extend across the bed between straight side wall portions of the side wall to strengthen the straight side wall portions against outward displacement when the bed is filled with plant growth media.

1 Claim, 16 Drawing Sheets

(56) References Cited

U.S. PATENT DOCUMENTS

| | | | | |
|---|---|---|---|---|
| 5,407,090 | A | * | 4/1995 | Boots .......................... 220/62.18 |
| 5,556,205 | A | * | 9/1996 | Gallie et al. ..................... 383/24 |
| 5,768,825 | A | | 6/1998 | Reiger |
| 6,202,348 | B1 | | 3/2001 | Reiger |
| 6,315,499 | B1 | | 11/2001 | Kittson ...................... 405/258.1 |
| 6,402,378 | B1 | * | 6/2002 | Shackleton .................. 383/119 |
| D463,319 | S | | 9/2002 | Stern ........................... D11/144 |
| 6,487,815 | B2 | * | 12/2002 | Rimback .......................... 47/44 |
| 6,612,072 | B2 | | 9/2003 | Busby |
| 6,625,929 | B1 | * | 9/2003 | Lawson et al. ................... 47/72 |
| 6,698,136 | B1 | | 3/2004 | Cleveland ......................... 47/39 |
| 7,020,997 | B1 | | 4/2006 | Thomas ............................ 47/39 |
| 7,080,653 | B2 | * | 7/2006 | Zheng .......................... 135/126 |
| D555,034 | S | | 11/2007 | Van de Wetering .......... D11/134 |
| 7,341,377 | B1 | * | 3/2008 | Baxter ............................ 383/38 |
| 7,810,275 | B2 | | 10/2010 | Whitcomb |
| 8,033,048 | B2 | | 10/2011 | Whitcomb .................... 47/32.7 |
| 8,695,796 | B2 | * | 4/2014 | Byers ......................... 206/315.9 |
| 2002/0048415 | A1 | * | 4/2002 | Derby et al. .................. 383/119 |
| 2005/0098555 | A1 | * | 5/2005 | Wang ................................ 220/6 |
| 2008/0190921 | A1 | * | 8/2008 | McNeely et al. ................. 220/6 |
| 2011/0232174 | A1 | | 9/2011 | Mills .............................. 47/20.1 |
| 2011/0247269 | A1 | | 10/2011 | Cool et al. ..................... 47/66.7 |
| 2012/0073195 | A1 | * | 3/2012 | Crosby ......................... 47/66.7 |
| 2012/0204486 | A1 | * | 8/2012 | Unruh ............................. 47/33 |
| 2013/0097968 | A1 | * | 4/2013 | Willner et al. ................. 53/410 |

OTHER PUBLICATIONS

Published Dec. 7, 2010; http://web.archive.org/web/20101207090156/http://www.bacsac.fr/en/ ; Retrieved Feb. 11, 2013.*

Published Feb. 27, 2011; http://web.archive.org/web/20110227061523/http://www.bacsac.fr/en/2010/02/13/collection-2010/ ; Retrieved Feb. 11, 2013.*

Published Feb. 27, 2011; http://web.archive.org/web/20110227195820/http://www.bacsac.fr/en/2010/02/13/its-nature-in-a-bag-2/ ; Retrieved Feb. 11, 2013.*

Published Nov. 23, 2010; http://web.archive.org/web/20101123125916/http://www.smartpots.com/pocket-planting ; Retrieved Feb. 11, 2013.*

Smart Pot Advertisement.
www.smartpots.com (big-bag-bed, and garlic-and-onion-pot).
www.geopot.com
www.bacsac.fr/en/.

* cited by examiner

ABOVE-GROUND PLANTING BED

The present application is a division of U.S. patent application Ser. No. 13/437,773 filed Apr. 2, 2012 for Above-Ground Planting Beds, which is incorporated by reference herein.

FIELD OF INVENTION

The present invention relates to above-ground planting beds for containing plant growth media and plants, and, more particularly, to such planting beds that have outer walls that are air and moisture permeable for healthy plant growth.

BACKGROUND OF THE INVENTION

Traditionally, above-ground planting beds have had metal, wooden or rigid plastic outer walls. In recent years there have been developed a variety of planting beds with outer walls made of air and moisture permeable, non-woven, fabric to promote healthy plant growth. Some of these use a metal, wooden or plastic frame, or strapping or structurally modified walls to maintain the walls in a desired shape. Those beds that do not use frames or strapping or structurally modified walls are limited to a cylindrical shape to which contained media would naturally force the walls of a non-rigid bed.

In contrast to the prior art, the present invention provides above-ground planting beds in non-cylindrical shapes, such as square, oval or rectangular shapes or variations thereof, without requiring rigid frames or strapping, and yet can be made of desirable air and moisture permeable, relatively inexpensive, material.

The present invention accomplishes the desired results using cylindrical or semi-cylindrical reinforcing inner walls of material similar to the material of the outer walls to retain plant growth media therein, and, advantageously, form compartments that optionally may contain different plant growth media to provide different growing conditions for different plants.

Preferably, all of the components are inexpensively formed from relatively light-weight, flexible material that is substantially non-freestanding for ease of collapsing and folding of the bed when not in use for compact handling, shipping and storage. The material is air and moisture permeable and collapsible fabric, more preferably non-woven, needle-punched polymeric, preferably a polypropylene geotextile fabric.

SUMMARY OF THE INVENTION

Briefly described, the above-ground planting bed of the present invention has an outer wall that forms a square, oval, rectangular or other non-cylindrical configuration. The bed has one or more cylindrical and/or two or more semi-cylindrical interior walls. All of the walls are formed of air and moisture permeable and collapsible fabric, preferably non-woven, needle-punched polymeric, preferably polypropylene, material.

In one preferred embodiment, the planting bed has two contiguous cylindrical inner walls forming a figure eight configuration with an outer wall that forms a rectangular bed having two straight side portions, two straight end portions with four rounded corners. Each cylindrical inner wall is tangentially contiguous with opposite side portions and an adjacent end portion. An interior cross wall extends interiorly laterally from and secured to each straight side wall portion across the bed to retain the straight sides substantially straight when the bed is filled with plant growth media. The cross wall may take different forms, such as a wall extending from the tangential contiguity of the cylindrical walls to the side wall portions or in the form of reinforcing cylindrical walls disposed in the spaces between and tangentially contiguous with the adjacent straight side portions and the primary two cylindrical inner walls. In small planting beds, it may not be necessary to utilize a cross wall.

In another embodiment of a planting bed of the present invention, a bed of the aforementioned embodiment has an outer wall in an oval configuration with semi-cylindrical end portions and straight side portions. Instead of two contiguous full cylindrical inner walls, two contiguous outwardly facing semi-cylindrical inner walls are secured to and extend from inner ends of the semi-cylindrical end portions, forming therewith full cylindrical configurations. In this case, the semi-cylindrical end portions and the straight side portions may be formed integrally from a single length of fabric.

In still another preferred embodiment, the outer wall is in a four-sided square configuration with generally rounded corners and a cylindrical inner wall tangentially contiguous with the four sides of the outer wall.

Preferably, all of the aforementioned walls are made from flat strips or sheets of flexible material that form the bed substantially non-freestanding for ease of collapsing and folding of the bed for compact handling, shipping and storage. Further, the material of the walls is preferably an air and moisture permeable, collapsible, nonwoven, needle-punched, polypropylene geotextile fabric.

DETAILED DESCRIPTION OF THE PREFERRED EMBODIMENTS OF THE PRESENT INVENTION

Figure 1:
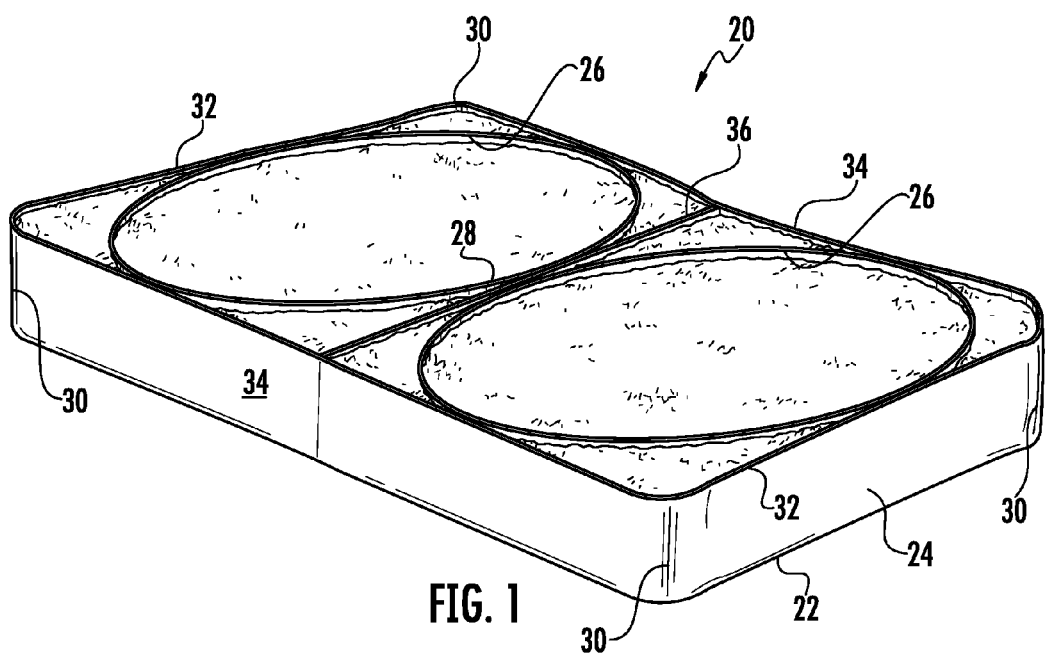
FIG. 1 is a perspective view of a preferred form of the planting bed of the present invention in a rectangular configuration filled with plant growth media.
Figure 2:
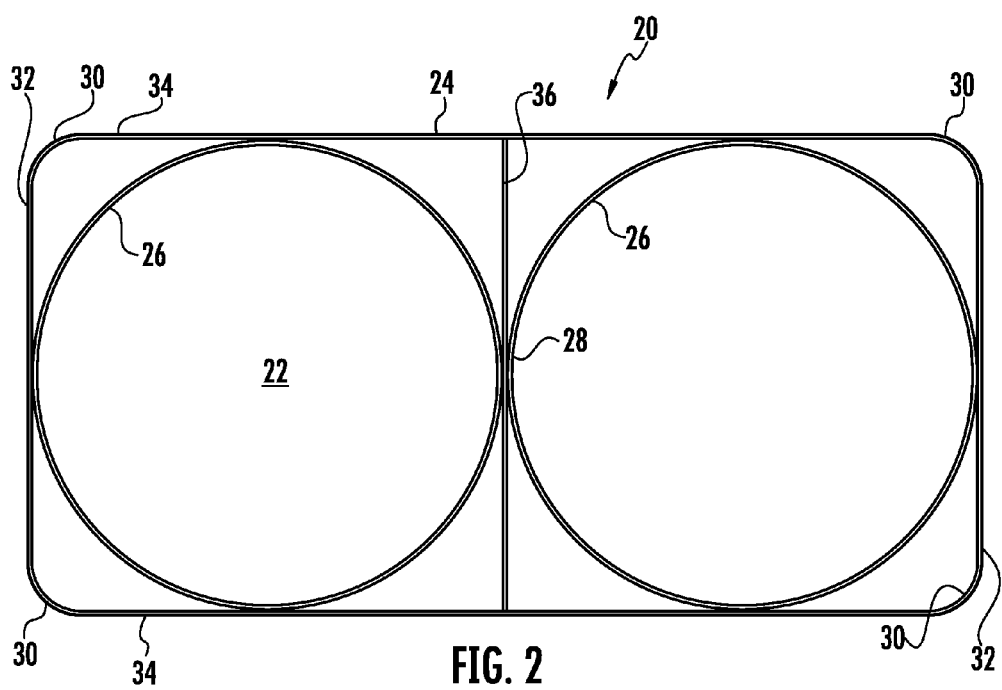
FIG. 2 is a plan view of the planting bed of FIG. 1.

The preferred embodiments of the planting beds of the present invention can be formed in square, rectangular, oval or any other desired non-cylindrical configurations, all incorporating one or more cylindrical or semi-cylindrical inner walls that utilize the cylindrical shape to retain plant growth media and thereby minimize deformation of the exterior of the bed by the plant growth media filled therein. As a result, the components of the bed can all be made of relatively lightweight and relatively inexpensive material for ease of collapsing and folding and provide desirable air and moisture permeability and yet support plant growth media without significant undesirable deformation of the bed outer wall.

Referring to FIGS. 1-5, a preferred embodiment of the planting bed 20 of the present invention is illustrated incorporating numerous features of the present invention. This planting bed 20 has a bottom wall 22 cut from a sheet of material in a rectangular pattern with rounded corners. A continuous outer wall 24 is secured to the bottom wall 22 and defines a continuous rectangular wall having opposed straight end wall portions 32 and opposed straight side wall portions 34 and has four rounded corners 30. Two cylindrical interior walls 26 are contiguous at a point of tangency 28 and are tangent with the opposed adjacent side and end portions 32, 34 of said outer side wall 24.

To facilitate retention of the opposed straight side portions 34 of the side wall 24 in relatively straight lines, an interior cross wall 36 extends interiorly laterally between and secured to each straight side wall portions 34, thus preventing outward deflection of the straight side wall portion 36 when the bed 20 is filled with plant growth media.

Figure 3:
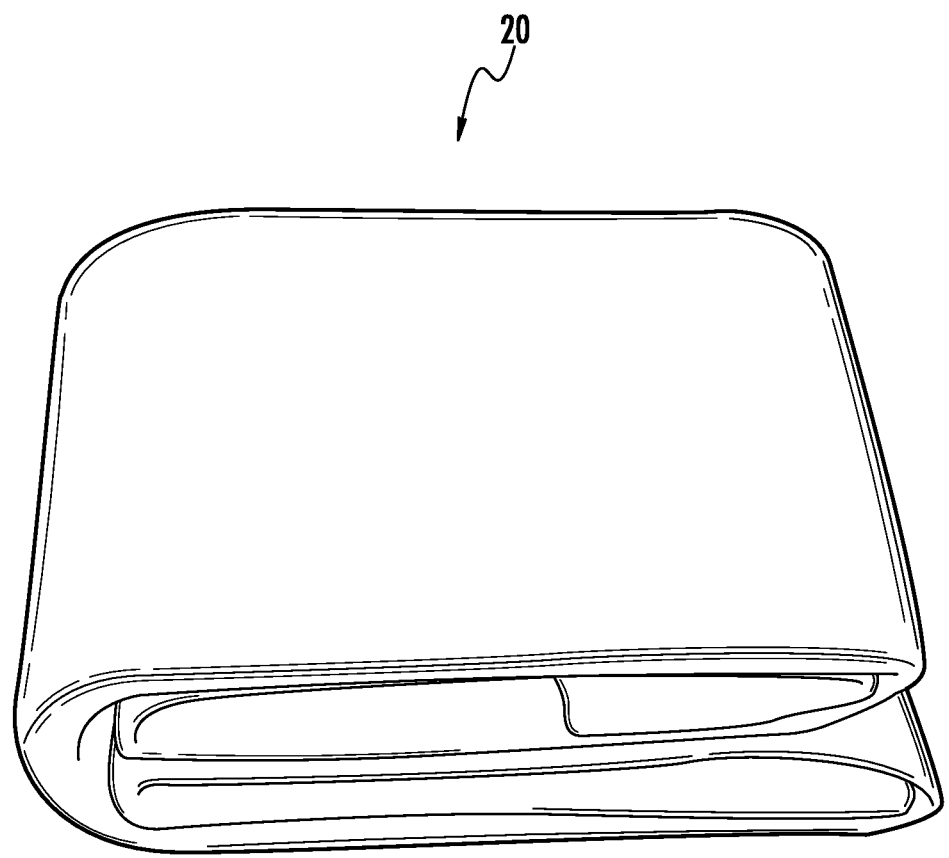
FIG. 3 is a perspective view of the planting bed of FIG. 1 in a folded condition.
Figure 4:
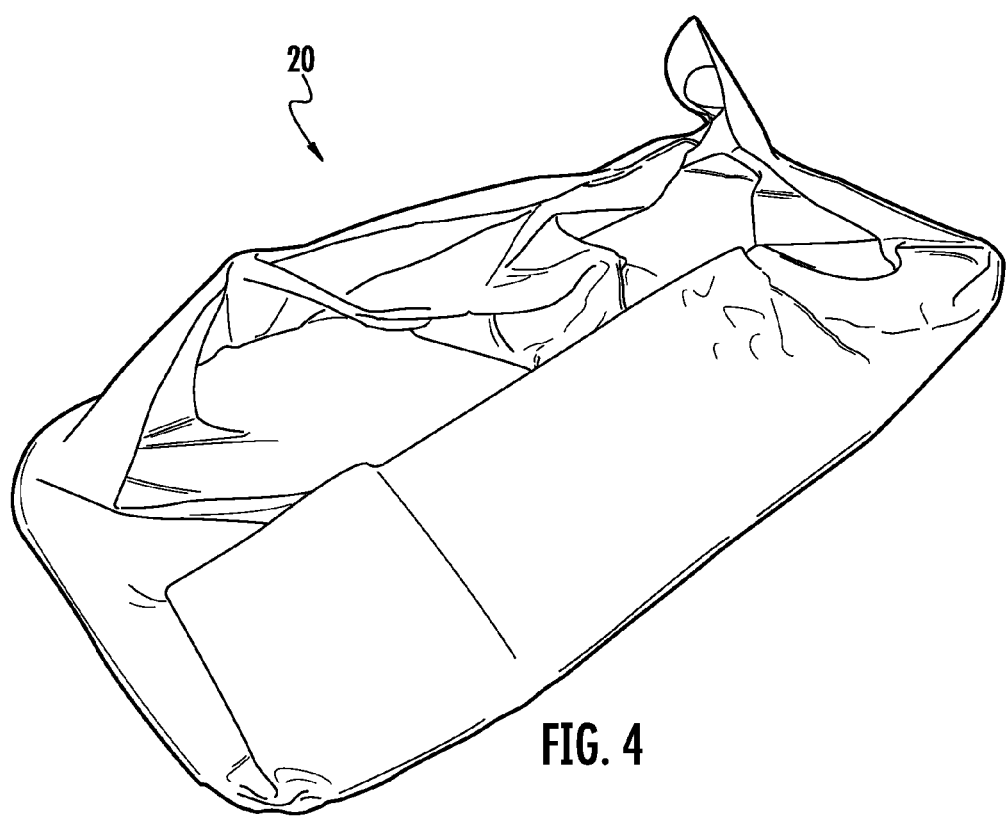
FIG. 4 is a perspective view of a partially unfolded and unfilled planting bed of FIG. 1.
Figure 5:
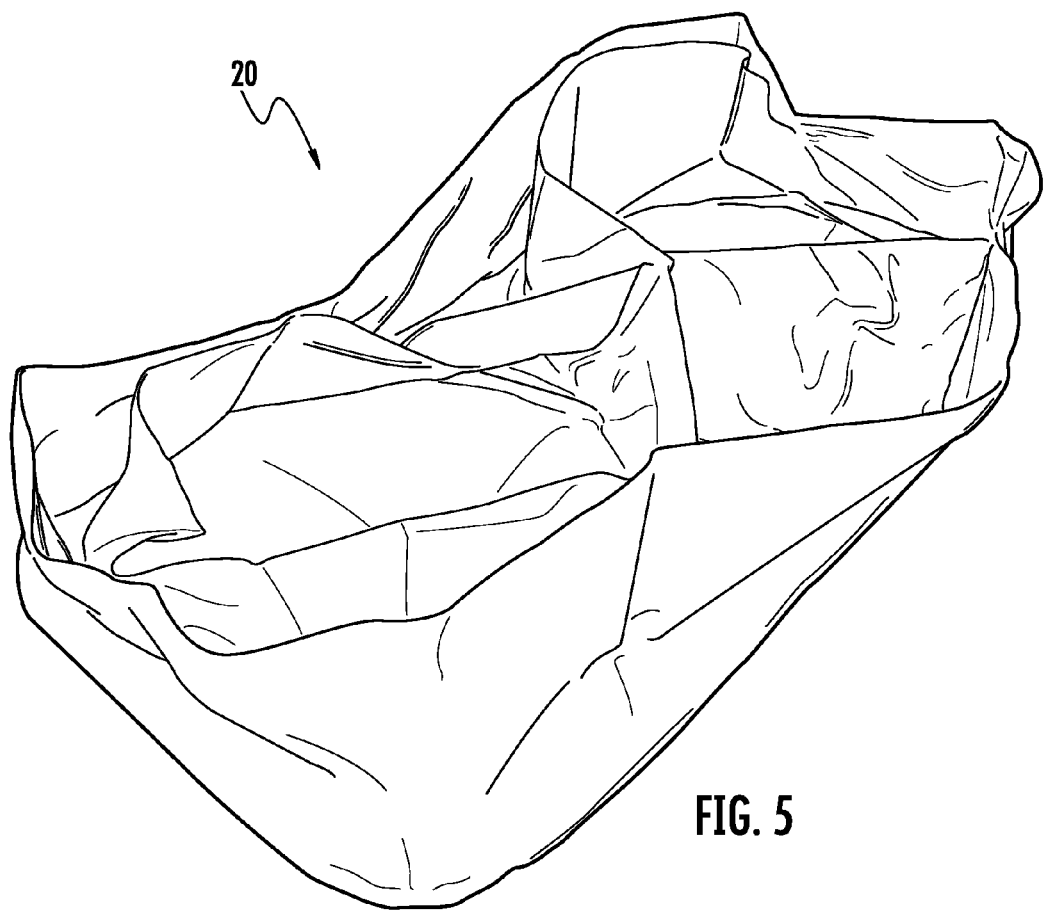
FIG. 5 is a perspective view of a fully unfolded and unfilled planting bed of FIG. 1.

FIG. 3 illustrates how compactly an empty bed 20 can be folded for ease of storage or shipment. When first unfolded the bed 20 is in a somewhat collapsed condition, as illustrated in FIG. 4. It can then be further opened, as illustrated in FIG. 5, but still remains substantially non-upstanding and not conducive to mechanical filling.

This somewhat flimsy condition of the unfolded bed 20 is a result of the relatively lightweight and relatively inexpensive material from which all of the components of the bed 20 are made. In the preferred embodiment the material is an air and moisture permeable, collapsible, non-woven, needle-punched, polymeric geotextile fabric. The polymeric material is preferably polypropylene. In a specific embodiment the polypropylene fabric of the bottom wall 22 weighs 8 ounces per square yard, and the fabric of all of the other walls weighs 6 ounces per square yard. A preferable 8 ounce fabric has been obtained from DALCO Nonwovens, LLC and bears the product designation of DalTex 1081 having a US sieve rating of 80 (ASTM D-4751), a mean air permeability of approximately 180 cubic feet per minute per square foot (ASTM D-737) and a water flow rate of 90 gallons per minute per square foot (ASTM D-4491). The 6 ounce fabric, also obtained from DALCO Nonwovens, LLC bears the product designation of DalTex 1061, has a US sieve rating of 70 (ASTM D-4751), a mean air permeability of approximately 170 (ASTM D-737), and a water flow rate of 110 gallons per minute per square foot (ASTM D-4751). One surface of these fabrics has been heat treated to provide a smooth outer surface on the planting bed. Other suitable fabrics providing desired characteristics may be used other than those specifically described herein.

Figure 6:
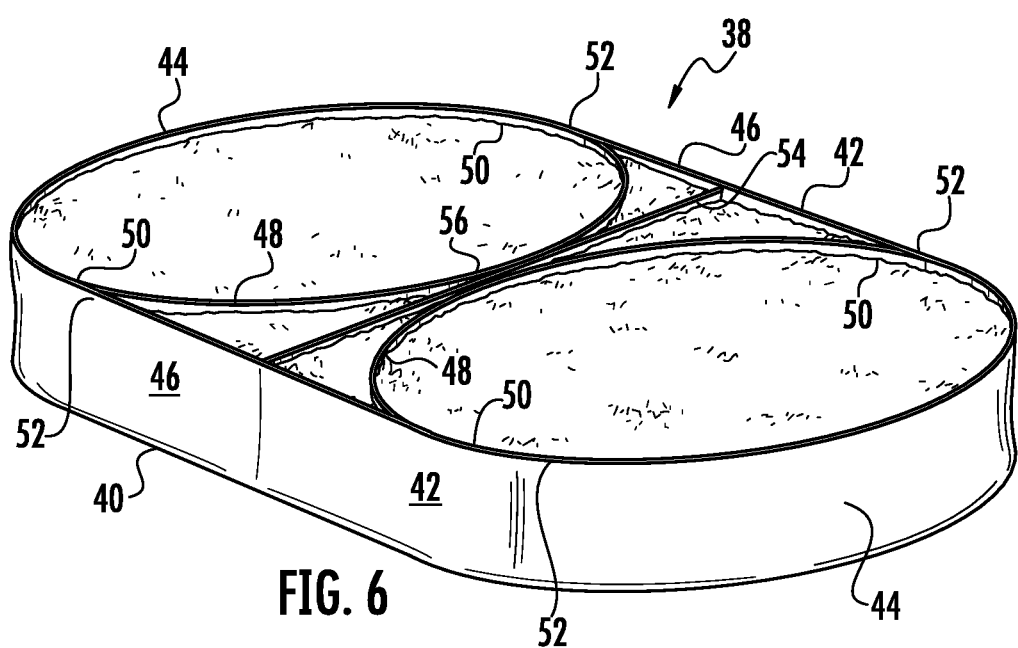
FIG. 6 is a perspective view of another preferred form of the planting bed of the present invention in an oval configuration filled with plant growth media.
Figure 7:
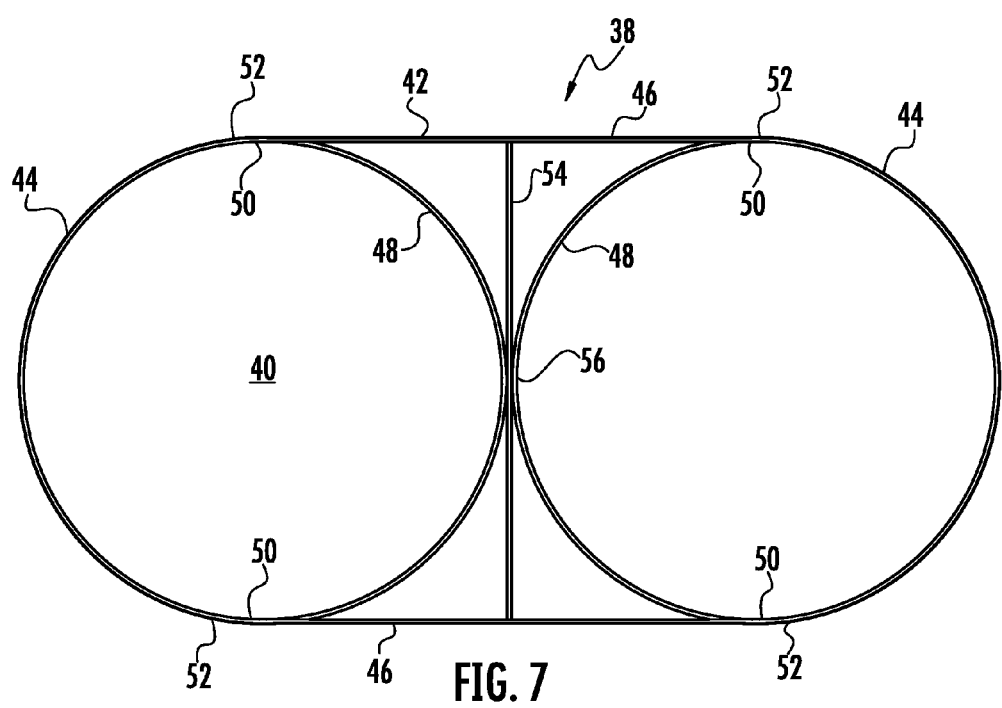
FIG. 7 is a plan view of the planting bed of FIG. 6.

FIGS. 6 and 7 illustrate a modified form 38 of the bed of FIGS. 1-5, in which the bottom wall 40 is oval shaped and the side wall 42 is, therefore, oval shaped having semi-cylindrical opposed end portions 44 and opposed straight side portions 46. Instead of two cylindrical components, such as in the bed 20 of FIGS. 1-5, this bed 38 has two tangentially contiguous semi-cylindrical inner walls 48 opening outwardly toward the end portions 44 of the sidewall 42 with the outer ends 50 of the semi-cylindrical inner walls 48 being contiguously secured to the inner ends 52 of the side wall end portions 44, thereby combining therewith to form cylindrical configurations. In this form of this embodiment, the end and side portions of the side wall 42 may be formed integrally from a single length of fabric. Similar to the bed 20 of FIGS. 1-5, the bed 38 of FIGS. 6 and 7 includes a cross wall 54 secured to and extending between the opposed side wall portions 42 and extends through the contiguity 56 of the semi-cylindrical walls 48.

Optionally, the semi-cylindrical end portions 44 of the side wall 42 and the inner semi-cylindrical walls 48 may be combined as integral full cylindrical walls with the side portions extending between the laterally outward extents of the full cylindrical walls.

Figure 8:
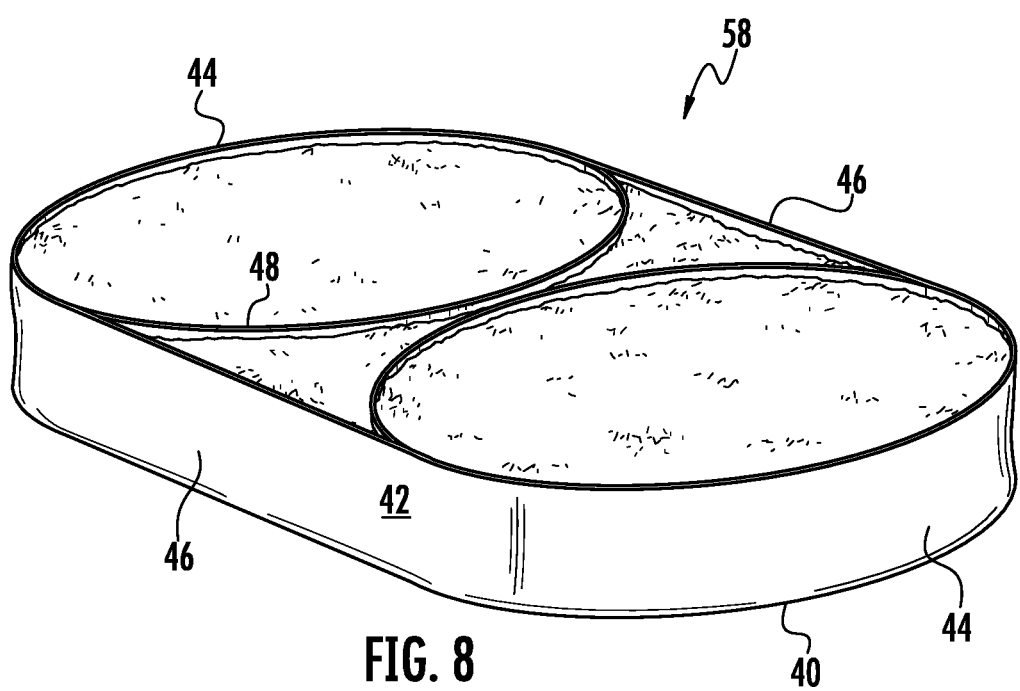
FIG. 8 is a perspective view of a modified form of the planting bed of FIG. 6 without the cross wall and filled with plant growth media.

FIG. 8 illustrates a variation of the bed 38 of FIGS. 6 and 7. In this variation the bed 58 is identical to the bed 38 of FIGS. 6 and 7 except that it does not include a cross wall, such as the cross wall 54 of the bed 38 of FIGS. 6 and 7. This modified bed 58 is usable for relatively small beds that are not as likely to have side portions deflect when the bed is filled.

Figure 9:
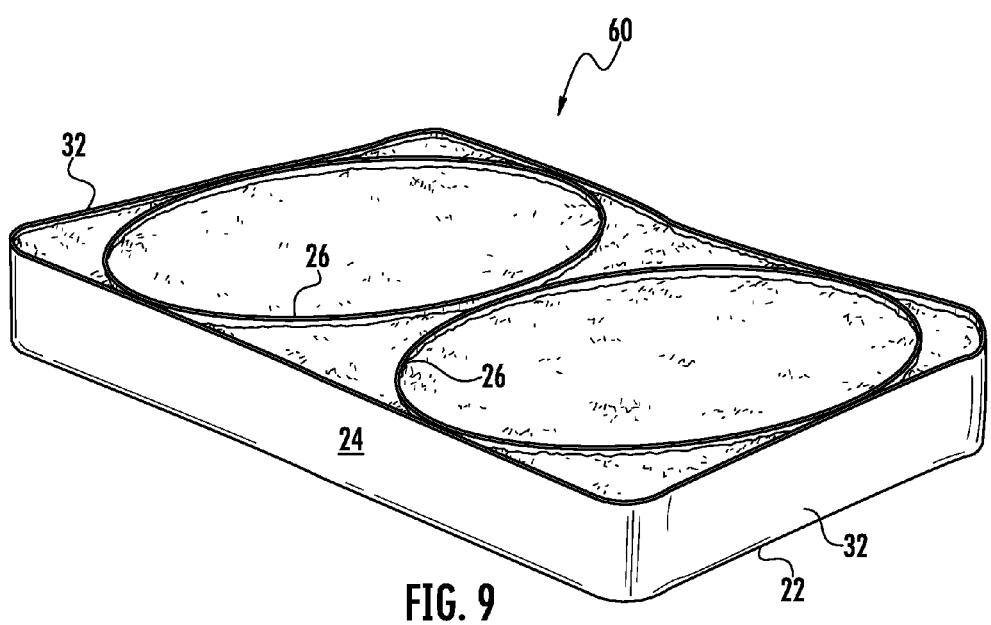
FIG. 9 is a perspective view of a modified form of the planting bed of FIG. 1 without the cross wall and filled with plant growth media.
Figure 10B:
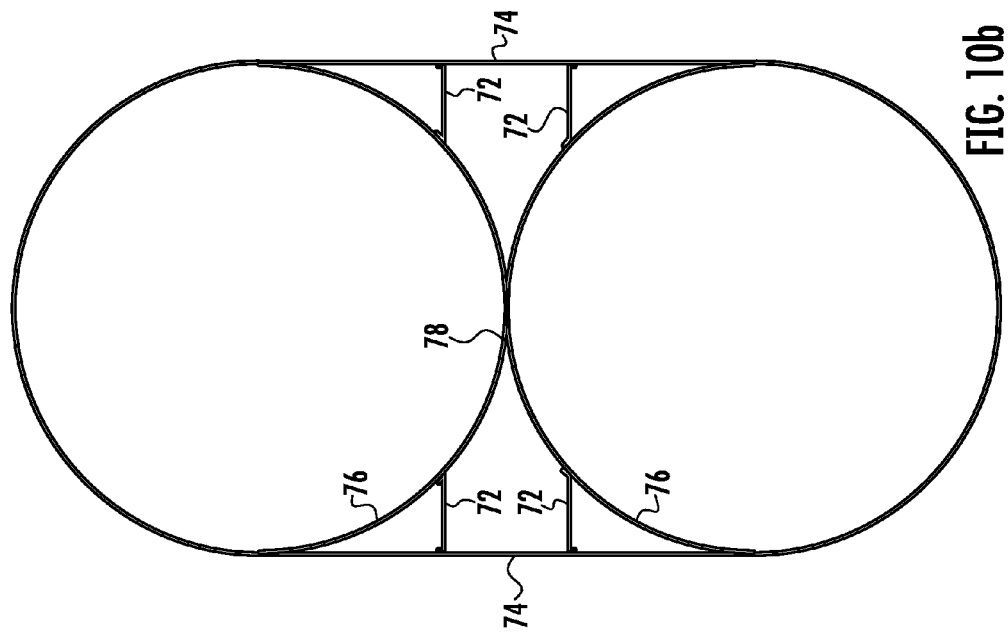
FIGS. 10(a), (b), (c) and (d) are plan views of various alternative forms of cross members of the planting bed of the present invention.
Figure 10A:
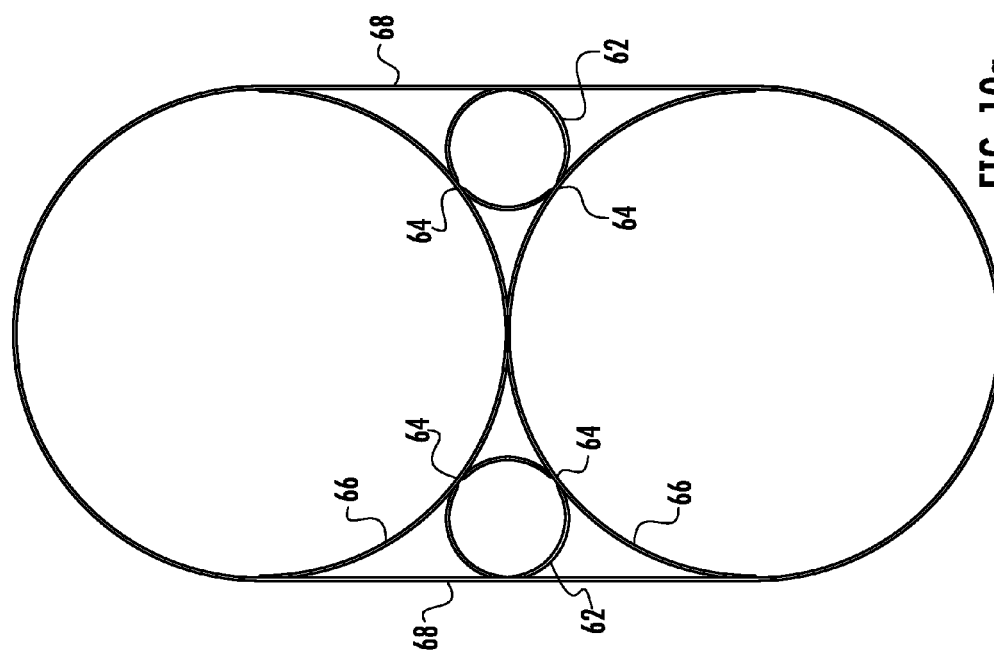
Figure 10D:
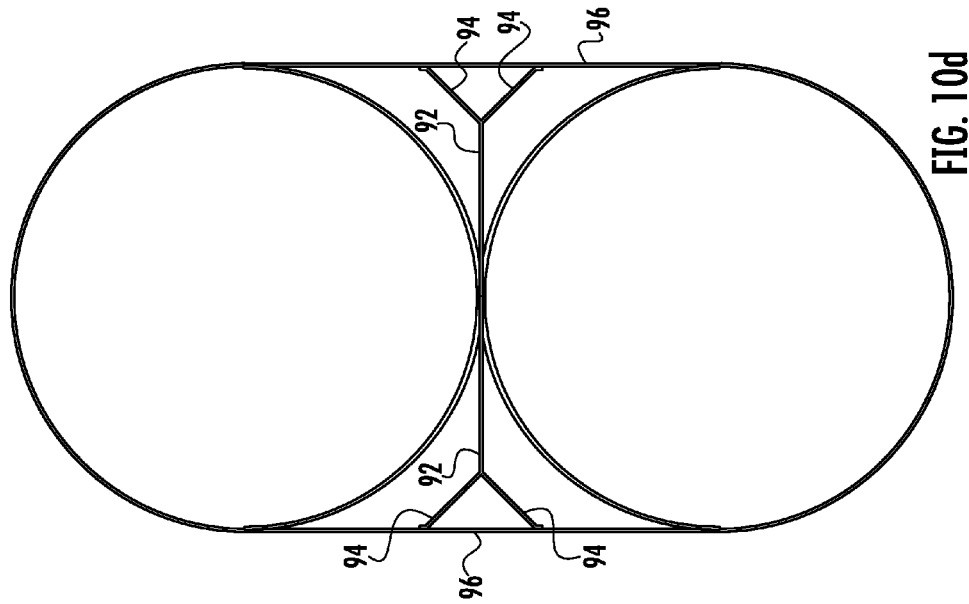
Figure 10C:
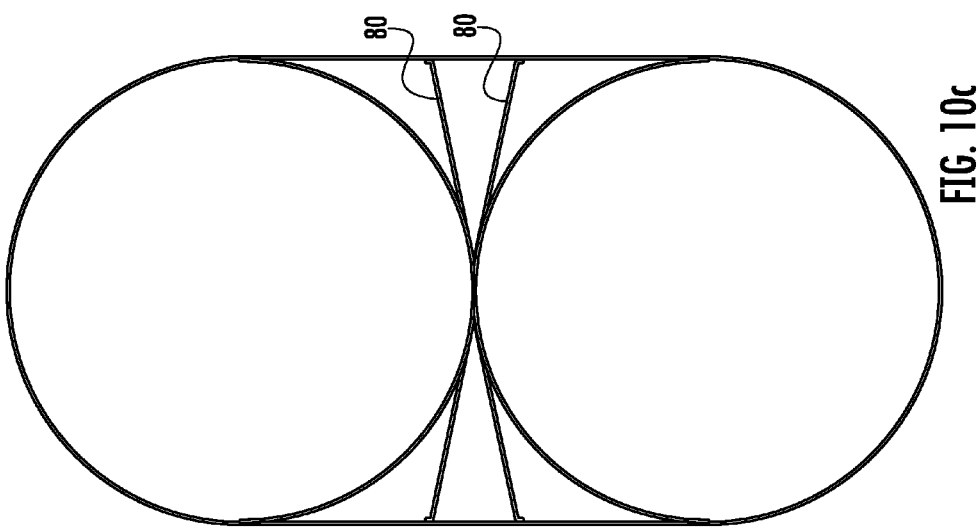

FIG. 9 illustrates a variation of the bed 20 of FIGS. 1-5. This bed 60, like the bed 58 of FIG. 8 does not include the cross wall 36 of the bed 20 of FIGS. 1-5.

In FIGS. 6,7,8, and 9, components identical to those illustrated in the embodiment of FIGS. 1-5 are identified by identical reference numerals.

Various alternative forms of cross walls are illustrated in FIGS. 10(*a*), (*b*), (*c*) and (*d*). In FIG. 10(*a*) a straight cross wall is replaced by a pair of small reinforcing cylindrical walls 62 in the spaces between the point of contiguity 64 of the semi-cylindrical walls 66 and the straight side wall portions 68. These small reinforcing cylindrical walls 62 are tangentially contiguous with both the semi-cylindrical walls 66 and the straight side wall portions 68 to provide support of the straight side wall portions 68 when the bed is filled with plant growth media.

The alternative form of cross wall illustrated in FIG. 10(*b*) consists of four short strips 72 secured between the straight side wall portions 74 and the cylindrical walls 76 at a spacing from the tangential contiguity 78 thereof.

The alternative form of cross wall 80 illustrated in FIG. 10(*c*) has two cross walls 82 extending slightly diagonally with respect to each other from one straight side wall portion 84 to the other straight side wall portion 86 with both cross walls 82 passing through the point of contiguity 83 of the two semi-cylindrical walls 90.

The further alternative form of cross wall 92 illustrated in FIG. 10(*d*) is a slight modification of the cross wall 36 of the bed 20 of FIGS. 1-5. It differs in that the cross wall 92 splits near each end into angled portions 94 that are secured to the straight side wall portions 96.

In the various cross wall embodiments described above where the cross wall passes through the point of contiguity of the cylindrical or semi-cylindrical walls, the cross walls can either be single cross walls extending from one straight side wall portion through the point of contiguity to the other straight side wall portion, or they can be half lengths, each extending from a straight side wall portion to the point of contiguity.

Figure 11:
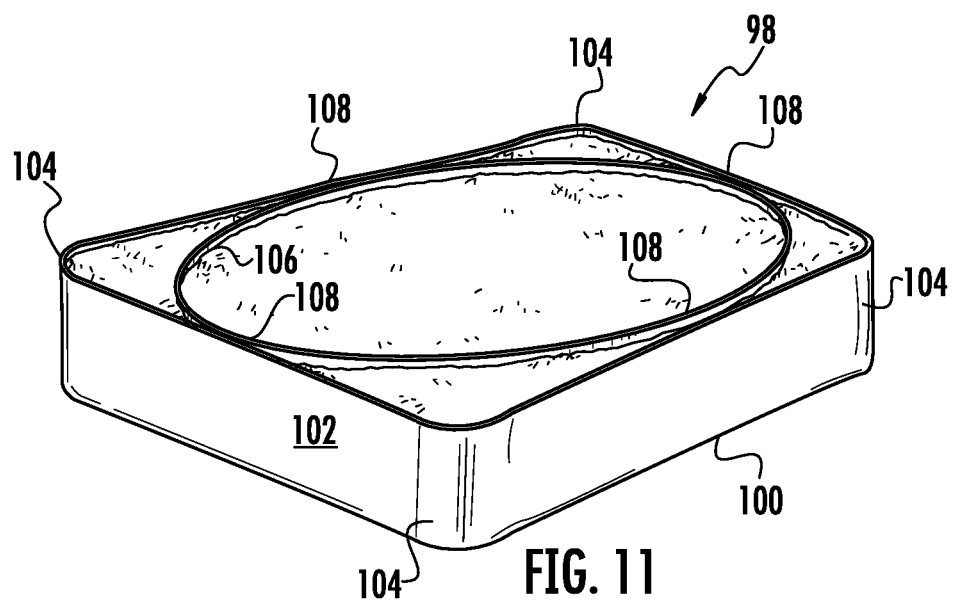
FIG. 11 is a perspective view of a square configuration of a planting bed of the present invention having a single inner cylindrical wall and filled with plant growth media.
Figure 12:
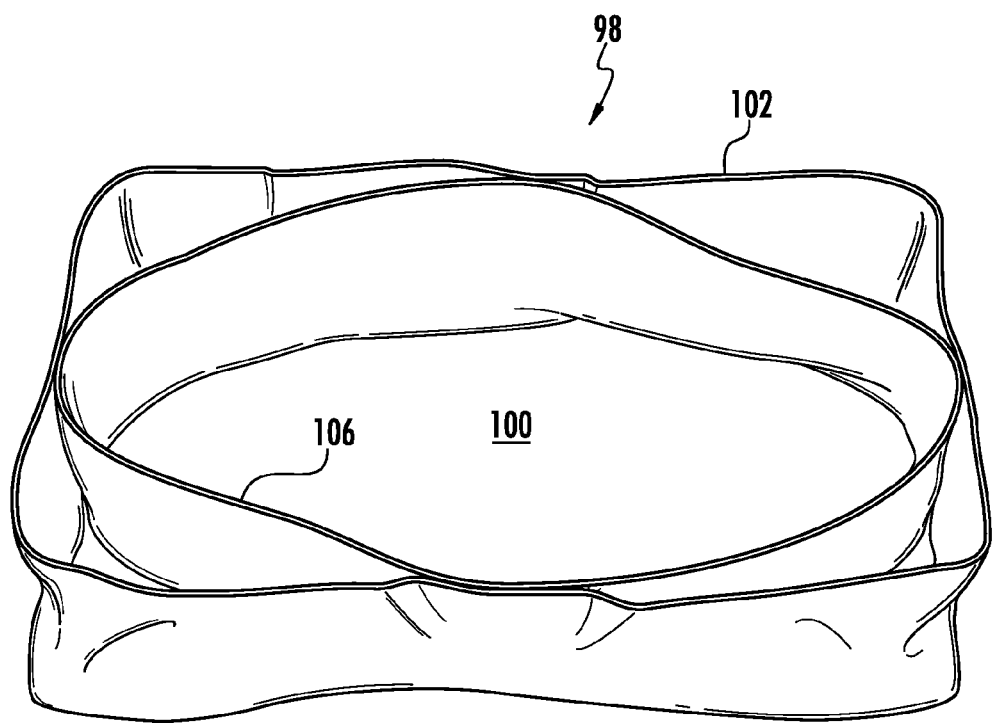
FIG. 12 is a perspective view of the planting bed of FIG. 11 prior to filling.

A square form of the plant bed of the present invention is illustrated in FIGS. 11 and 12. This bed 98 has a square bottom wall 100 with rounded corners and a side wall 102 secured to the bottom wall 100 to form the square bed 98 with rounded corners 104. A single interior cylindrical wall 106 is located within the bed 98 and is secured to the bottom wall 100 and is secured tangentially contiguous to each of the four sides of the side wall 102. This bed 98 is made of the same material as the other embodiments and therefore, as illustrated in FIG. 12, is slightly collapsed rather than being rigidly upstanding when the bed is empty of plant growth media.

If desired, the walls within the confines of the side wall of any of the embodiments may be of slightly lesser height than the side wall so that the inner walls can be hidden from view when the bed is filled with plant growth media.

Figure 13:
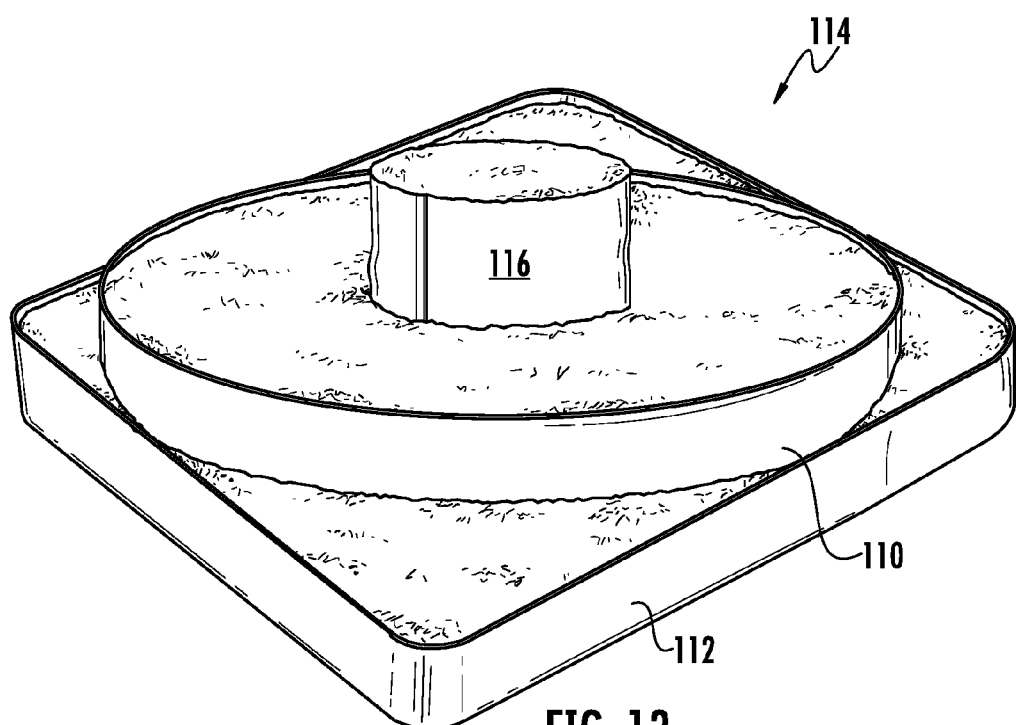
FIG. 13 is a perspective view of a multi-tiered planting bed embodying features of the present invention and filled with plant growth media.
Figure 14:
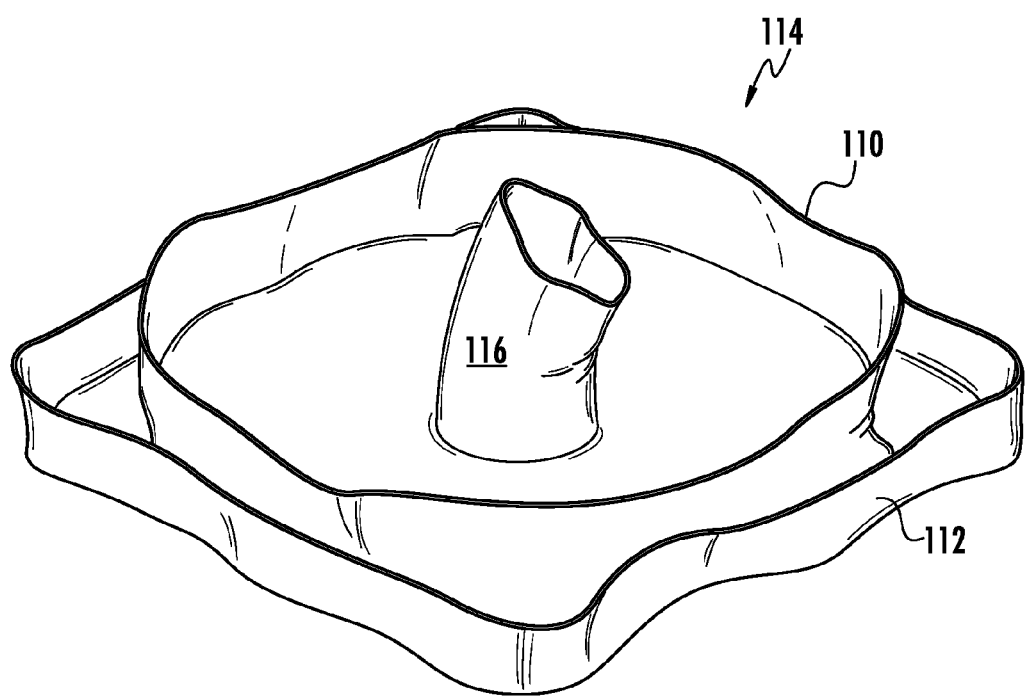
FIG. 14 is a perspective view of the multi-tiered planting bed of FIG. 13 prior to filling.

The planting bed of the present invention is susceptible of various combinations of components to provide varied plant depth requirements or for decorative appearances. For example, with reference to FIGS. 13 and 14, the main inner cylindrical wall 110 can be of a greater height than the outer side wall 112 so that a tiered bed 114 is formed. This tiered bed 114 further includes a small central cylindrical wall 116 extending above the height of the main cylindrical wall 110 to provide a further desired effect. FIG. 14 illustrates this bed 114 in its unfilled, somewhat collapsed configuration.

Figure 15A:
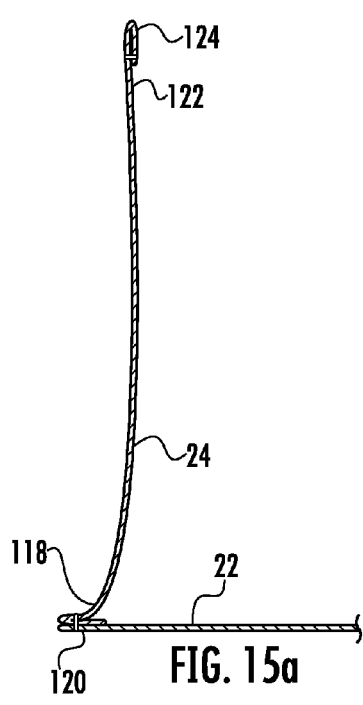
FIGS. 15(*a*), (*b*), (*c*), and (*d*) are sectional views illustrating various forms of the securement of the walls of the planting bed of the present invention.
Figure 15B:
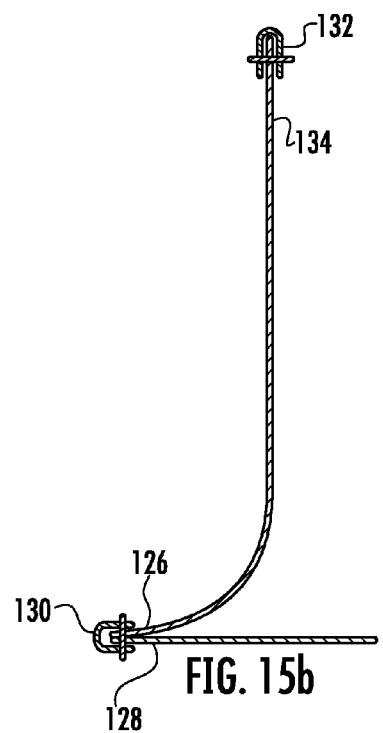
Figure 15C:
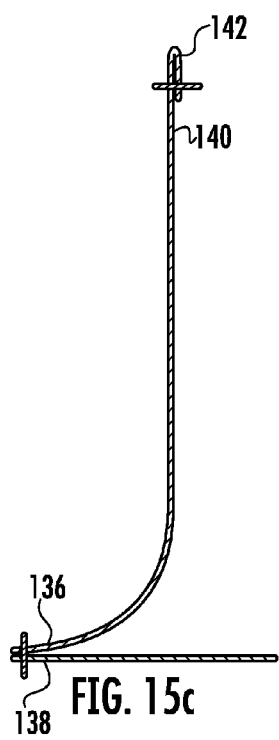
Figure 15D:
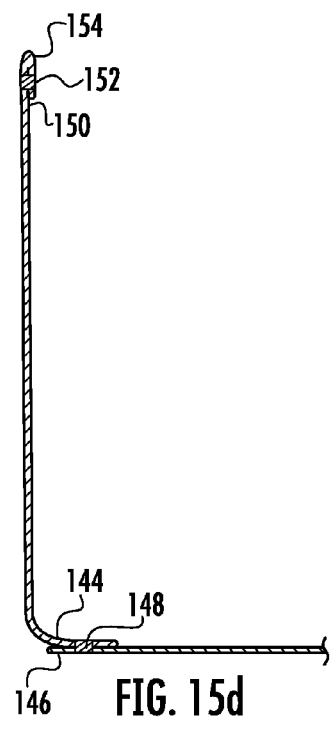

The various walls of the beds of the present invention can be secured together in any conventional or unconventional manner. Various securement means are disclosed in FIGS. 15(a), (b), (c) and (d). In these figures the bottom wall and the side wall are identified with the reference numerals 22 and 24 of the bed 20 of FIGS. 1-5, but the same securement can be utilized with any of the embodiments. In FIG. 15(a) the side wall 24 has its lower end 118 folded under and secured by welding or stitching to the outer edge 120 of the bottom wall 22. The top 122 of the side wall 24 is folded over and secured by welding or stitching to form a hem 124. In FIG. 15(b) the lower end 126 of the side wall 24 lays on top of the end 128 of the bottom wall 22 with their outer edges vertically aligned and secured by an overlapping binding 130 with stitching 108. A binding 132 also encloses the top 134 of the side wall 24 and is secured by stitching 114. In FIG. 15(c) the lower end 136 of the side wall 24 is vertically aligned with the outer edge 138 of the bottom wall 22 and secured thereto by stitching, and the upper end 140 of the side wall 24 is folded over and secured by welding or stitching to form a hem 142. In the form of securement illustrated in FIG. 15(d), the lower end 144 of the side wall 24 is overlapped on the outer end 146 of the bottom wall 22 and secured thereto by welding or stitching 148, and the top edge 150 of the side wall 24 is folded over and secured in place by welding or stitching 152 to form a hem 154. The other walls and wall portions of the various forms of beds can be secured to the interior of the bottom wall in the manners illustrated in FIGS. 15(a) and (d).

In some instances it may be acceptable to avoid the use of a hem or binding at the top of the side wall.

In the embodiments described all of the walls are secured to the bottom wall and to each other at points of contiguity.

A significant advantage of having cylindrical or semi-cylindrical walls and cross walls within the outer side wall is that these components form separate compartments within the bed that can be used to contain different plant growth media for growing different plants.

In view of the aforesaid written description of the present invention, it will be readily understood by those skilled in the art that the present invention is susceptible of broad utility and application in many embodiments and adaptations of the present invention other than those herein described. Many variations and modifications will be apparent from or reasonably suggested by the present invention and the foregoing description thereof without departing from the substance or scope of the present invention. For example, this invention is applicable to non-cylindrical shapes other than those specifically disclosed herein. Accordingly, while the present invention has been described herein in detail in relation to preferred embodiments, it is to be understood that this disclosure is only illustrative of examples of the present invention and is made merely for purposes of providing a full and enabling disclosure of the invention. The foregoing disclosure is not intended nor is it to be construed to limit the present invention or otherwise exclude any other embodiment, adaptations, variations, modifications and equivalent arrangements, the present invention being limited only by the scope of the claims appended hereto and equivalents thereof.

What is claimed is:

1. An above-ground planting bed, comprising:
   a generally rectangular bottom wall;
   a four-sided outer wall secured to said bottom wall and forming with said bottom wall a generally rectangular bed with generally rounded corners,
      said outer wall having two opposing straight end portions and two opposing straight side portions,
      said side portions being twice as long as said end portions;
   two contiguous cylindrical inner tubular reinforcing walls,
      each of said inner walls being of generally circular cross-section and having diameters equal to the lengths of said end portions,
      said cylindrical inner tubular reinforcing walls being tangentially contiguous to each other to form a generally figure-eight configuration,
      each said cylindrical inner tubular reinforcing wall being tangentially secured to both said opposing straight side portions and to one straight end portion for strengthening said outer wall in its rectangular shape when said planting bed contains plant growth media; and
   wherein said bottom wall, said outer wall and said tubular reinforcing walls are substantially formed from air and moisture permeable, collapsible fabric;
   characterized further by a cross wall extending interiorly laterally across said bed through the tangentially contiguous portion between said cylindrical inner tubular reinforcing walls from and secured to said opposing straight side portions,
   wherein said cross wall retains said straight side wall portions substantially straight when said bed is filled with plant growth media.

* * * * *